US008472793B2

United States Patent
Momose

(10) Patent No.: US 8,472,793 B2
(45) Date of Patent: Jun. 25, 2013

(54) PLAYBACK APPARATUS AND PLAYBACK METHOD

(75) Inventor: Takeshi Momose, Saitama (JP)

(73) Assignee: Sony Corporation (JP)

( * ) Notice: Subject to any disclaimer, the term of this patent is extended or adjusted under 35 U.S.C. 154(b) by 101 days.

(21) Appl. No.: 12/998,406

(22) PCT Filed: Oct. 28, 2009

(86) PCT No.: PCT/JP2009/068855
§ 371 (c)(1),
(2), (4) Date: Apr. 15, 2011

(87) PCT Pub. No.: WO2010/050608
PCT Pub. Date: May 6, 2010

(65) Prior Publication Data
US 2011/0194832 A1    Aug. 11, 2011

(30) Foreign Application Priority Data
Oct. 30, 2008  (JP) ................ P2008-280147

(51) Int. Cl.
H04N 5/783    (2006.01)
H04N 9/80     (2006.01)
H04N 5/93     (2006.01)

(52) U.S. Cl.
USPC ........... 386/349; 386/239; 386/241; 386/248; 386/343; 386/353

(58) Field of Classification Search
USPC .................. 386/239–248, 343–357
See application file for complete search history.

(56) References Cited

U.S. PATENT DOCUMENTS

| 5,778,137 A * | 7/1998 | Nielsen et al. ............... 386/239 |
| 5,999,694 A * | 12/1999 | Yasuda et al. ................ 386/349 |
| 2004/0158862 A1* | 8/2004 | Nam et al. ..................... 725/52 |
| 2006/0215522 A1* | 9/2006 | Chen .......................... 369/53.37 |
| 2007/0047645 A1* | 3/2007 | Takashima ................ 375/240.2 |

FOREIGN PATENT DOCUMENTS

| JP | 2001-333388 A | 11/2001 |
| JP | 2002-025235 A | 1/2002 |
| JP | 2002-112201 A | 4/2002 |
| JP | 2003-228966 A | 8/2003 |
| JP | 2006-217126 A | 8/2006 |
| JP | 2006-352587 A | 12/2006 |
| JP | 2007-082114 A | 3/2007 |
| JP | 2007-180938 A | 7/2007 |

* cited by examiner

*Primary Examiner* — Hung Dang
(74) *Attorney, Agent, or Firm* — Lerner, David, Littenberg, Krumholz & Mentlik, LLP

(57) ABSTRACT

The present invention provides a technique for easily achieving a resume function for moving image content stored in one file in a removable recording medium.

According to the present invention, a removable disc (Di1) in which moving image content stored in one file and another content are stored is played back, and, when playback of MPEG4 moving image file in the disc (Di1) that is played back is stopped and the disc (Di1) is removed, the file size, the file name, and the address of the MPEG4 moving image file are stored in a RAM 8. When the disc (Di1) is loaded again and the MPEG4 moving image file is played back, if it is determined that the disc (Di1) is identical to the removed disc by reading the file size and the file name stored in the RAM 8, playback of the MPEG4 moving image file is resumed on the basis of the address stored in the RAM 8.

10 Claims, 8 Drawing Sheets

| TYPES OF FILE | EXTENSIONS |
|---|---|
| MUSIC FILE | .wav, .m4a, .m2a, .ac3, etc. |
| MPEG4 MOVING IMAGE FILE | .AVI, .mp4, etc. |

PLAYBACK APPARATUS AND PLAYBACK METHOD

CROSS-REFERENCES TO RELATED APPLICATIONS

The present application is a national phase entry under 35 U.S.C. §371 of International Application No. PCT/JP2009/068855 filed Oct. 28, 2009, published on May 6, 2010 as WO 2010/050608 A1, which claims priority from Japanese Patent Application No. JP 2008-280147 filed in the Japanese Patent Office on Oct. 30, 2008.

TECHNICAL FIELD

The present invention relates to a playback apparatus and a playback method, and is suitably applied to an MPEG (Moving Picture Experts Group)-4 car DVD (Digital Versatile Disc) player, for example.

BACKGROUND ART

In the related art, a DVD player has a so-called resume function of resuming playback of a DVD disc from a scene displayed just before the DVD disc is ejected if the disc is once ejected during the playback and then loaded into the DVD player again.

This function can be achieved because, in the case of a DVD disc, various types of information, such as a disc ID (IDentification) for identification of the disc, a title number and a track number with which playback time can be controlled, and playback time, is stored in accordance with the format of the disc.

That is, when the DVD player once ejects the DVD disc during the playback, the DVD player stores various types of information such as the disc ID, the title number, the track number, and the playback time thereof.

Then, when a DVD disc is loaded into the DVD player, the DVD player determines whether or not the DVD disc is the ejected DVD disc by reading the disc ID, and then resumes playback processing from the scene displayed just before the ejection on the basis of the disc ID, title number, track number, and playback time that have previously been stored (for example, see PTL1 and PTL2).

CITATION LIST

PTL 1: Japanese Unexamined Patent Application Publication No. 2006-217126
PTL 2: Japanese Unexamined Patent Application Publication No. 2007-180938

SUMMARY OF INVENTION

Now, the DVD player is not able to identify discs such as a CD-R (Compact Disc-Recordable), a DVD-R (Digital Versatile Disc-Recordable), and a DVD-RW (Digital Versatile Disc-ReWritable) because an MPEG4 moving image file conforming to a moving image file format such as "DivX" or "MPEG-4 AVC (Moving Picture Experts Group phase 4 Advanced Video Coding)/H.264" written to these discs has no disc ID.

Moreover, the MPEG4 moving image file has no concept of "title" and "chapter", and is simply a single file. Furthermore, information on playback time is not written to the MPEG4 moving image file.

Therefore, there has been a problem in that, when a disc is once ejected after stopping the playback halfway of an MPEG4 moving image file, an MPEG4-compatible DVD player is not able to recognize whether or not a disc loaded into the DVD player again is the ejected disc and to which point playback proceeded, and is therefore not able to resume playback from a point at which the playback was stopped.

The present invention has been made in view of the above-described circumstances, and proposes a playback apparatus that can easily achieve a resume function for moving image content stored in one file in a removable recording medium.

To achieve the above-described object, according to the present invention, a removable recording medium in which moving image content stored in one file and another content other than the moving image content are stored is played back, and, when playback of the moving image content on the recording medium is stopped and the recording medium is removed, the file size of the recording medium, all file names corresponding to the moving image content and the other content, and an absolute address are stored. When the recording medium is loaded again and the moving image content is played back, if it is determined that the recording medium is identical to the removed recording medium by reading the file size and all the file names stored in storing means, playback processing of the moving image content is resumed on the basis of the absolute address stored in the storing means.

As a result, even when, after playback processing of moving image content on a recording medium in which the moving image content stored in one file and another content are stored together is stopped and the recording medium is removed, the recording medium is loaded again and playback processing of the moving image content is performed, it is possible to resume playback processing immediately from a point at which the playback processing was stopped.

According to the present invention, even when, after playback processing of moving image content on a recording medium in which the moving image content stored in one file and another content are stored together is stopped and the recording medium is removed, the recording medium is loaded again and playback processing of the moving image content is performed, it is possible to resume playback processing immediately from a point at which the playback processing was stopped. This makes it possible to achieve a playback apparatus and a playback method that can easily achieve a resume function for moving image content stored in one file in a removable recording medium without forcing the user to perform fast-forwarding.

DESCRIPTION OF EMBODIMENTS

Best modes for carrying out the invention (hereinafter referred to as embodiments) will be described below. The description will be given in the following order:
1. First Embodiment
2. Second Embodiment
3. Third Embodiment
4. Other Embodiments (modified examples)

1. First Embodiment

1-1. Configuration of a Car DVD Player

Figure 1:
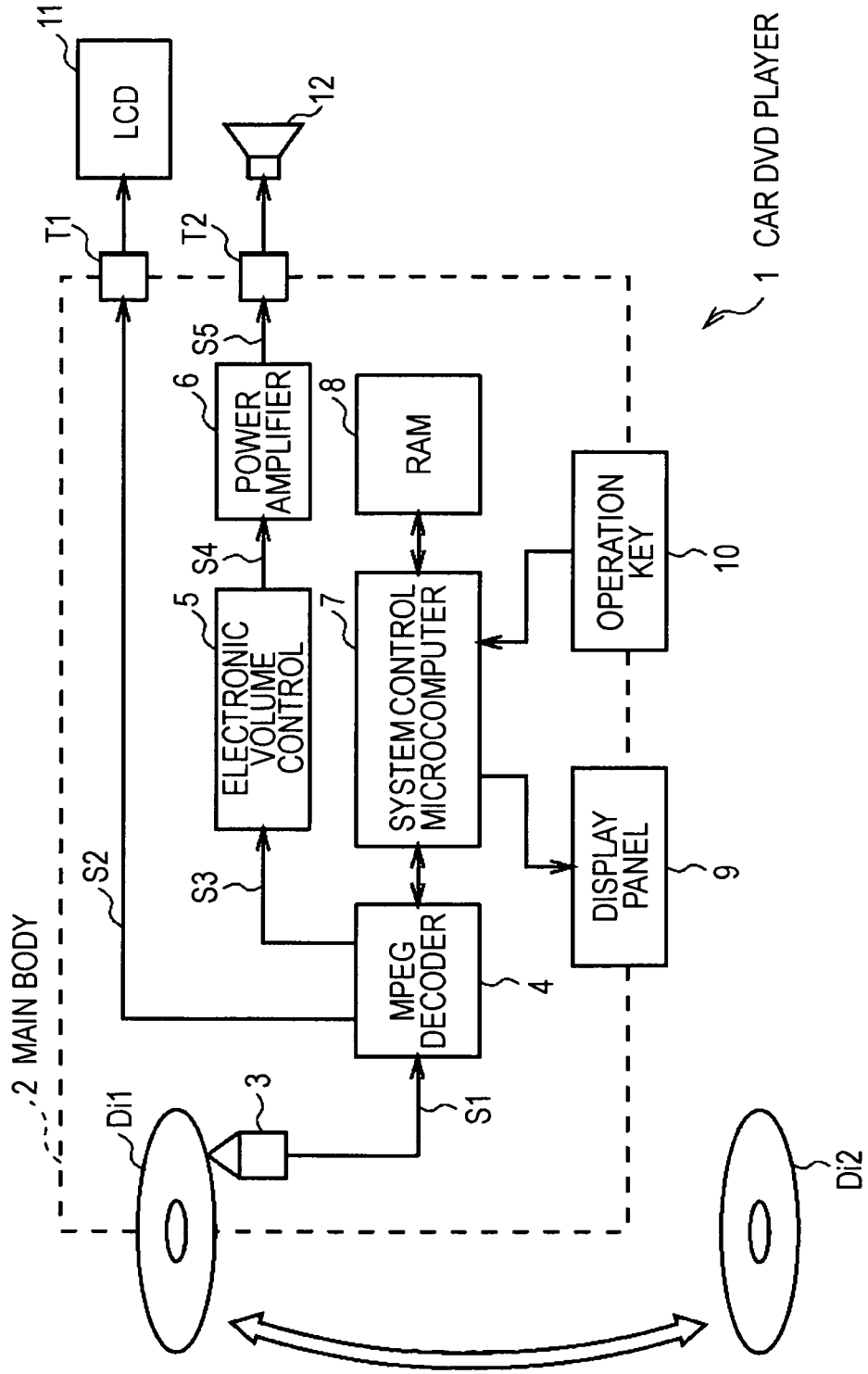
FIG. 1 is a schematic block diagram showing a configuration of a car DVD player according to first to third embodiments.

In FIG. 1, reference numeral 1 denotes a car DVD player according to a first embodiment used as a whole as an in-car device. In the car DVD player 1, an LCD (Liquid Crystal Display) 11 and a speaker 12 are connected to a main body 2.

In this car DVD player 1, a system control microcomputer 7 configured as a CPU (Central Processing Unit) performs the overall control and achieves various functions by loading a basic program or various application programs stored in a ROM (Read Only Memory) or the like into a RAM (Random Access Memory) 8.

Here, the car DVD player 1 accepts a command based on pressing operation performed by the user on a plurality of operation keys 10 provided on a front panel (not shown) of the main body 2, and makes a display panel 9 formed of an FL (Fluorescent Lamp) tube and the like display various types of information such as a title of playback results and playback time.

When a DVD disc Di1 in which an MPEG4 moving image file, for example, is stored is loaded into the main body 2, the car DVD player 1 reads data of the disc Di1 using a laser pickup 3, and sends playback data S1 to an MPEG decoder 4.

The MPEG decoder 4 acquires a video signal S2 and an audio signal S3 by subjecting the playback data S1 to decoding processes based on MPEG4. The video signal S2 is output to the LCD 11 via an output terminal T1, so that playback video images are displayed.

Moreover, the MPEG decoder 4 sends the audio signal S3 to an electronic volume control 5. The electronic volume control 5 controls the volume based on the audio signal S3, and sends an audio signal S4 thus obtained to a power amplifier 6.

The power amplifier 6 amplifies the audio signal S4 to a predetermined level, and supplies an audio signal S5 obtained as result of amplification to the speaker 12 via an output terminal T2, whereby playback audio is output.

Furthermore, when the disc Di1 is ejected from the main body 2 and a next disc Di2 is loaded, the car DVD player 1 performs playback processing of the disc Di2 in the same manner as that of the disc Di1.

1-2. Directory Configuration

Next, a directory configuration of the disc Di1 used as a main object to be played back in the present invention will be described with reference to FIG. 2.

In the disc Di1, a music file A, an MPEG4 moving image file B, and a music file C are stored in a lower hierarchy of a root directory indicated by "Root". When the disc Di1 is loaded into the car DVD player 1, the music file A, the MPEG4 moving image file B, and the music file C are played back in this order.

1-3. Data Structure

Next, a data structure of data stored in the disc Di1 will be described with reference to FIG. 3. In the disc Di1, as a TOC (Table Of Contents), a disc ID (IDentification) for identification of the disc Di1 and a file size are written in a read-in area AR1 from absolute address "000" to absolute address "100".

Moreover, in the disc Di1, as a directory record corresponding to a table of contents of the disc Di1, all file names and the range of absolute addresses in which these files are stored are written in a directory record area AR2 from absolute address "101" to absolute address "200".

Furthermore, in the disc Di1, actual data of the music file A is written in the range of absolute address "201" to absolute address "300" of an actual data area AR3, actual data of the MPEG4 moving image file B is written in the range of absolute address "301" to absolute address "700", and actual data of the music file C is written in the range of absolute address "701" to absolute address "800".

Here, when the car DVD player 1 ejects the disc Di1 after stopping playback processing at absolute address "500" corresponding to, for example, a point X of the disc Di1, and the disc Di1 is loaded thereinto again, the car DVD player 1 resumes the playback processing by using the absolute address 500" corresponding to the point X as a playback point.

1-4. Basic Procedure to Resume Playback Processing

Figure 4:
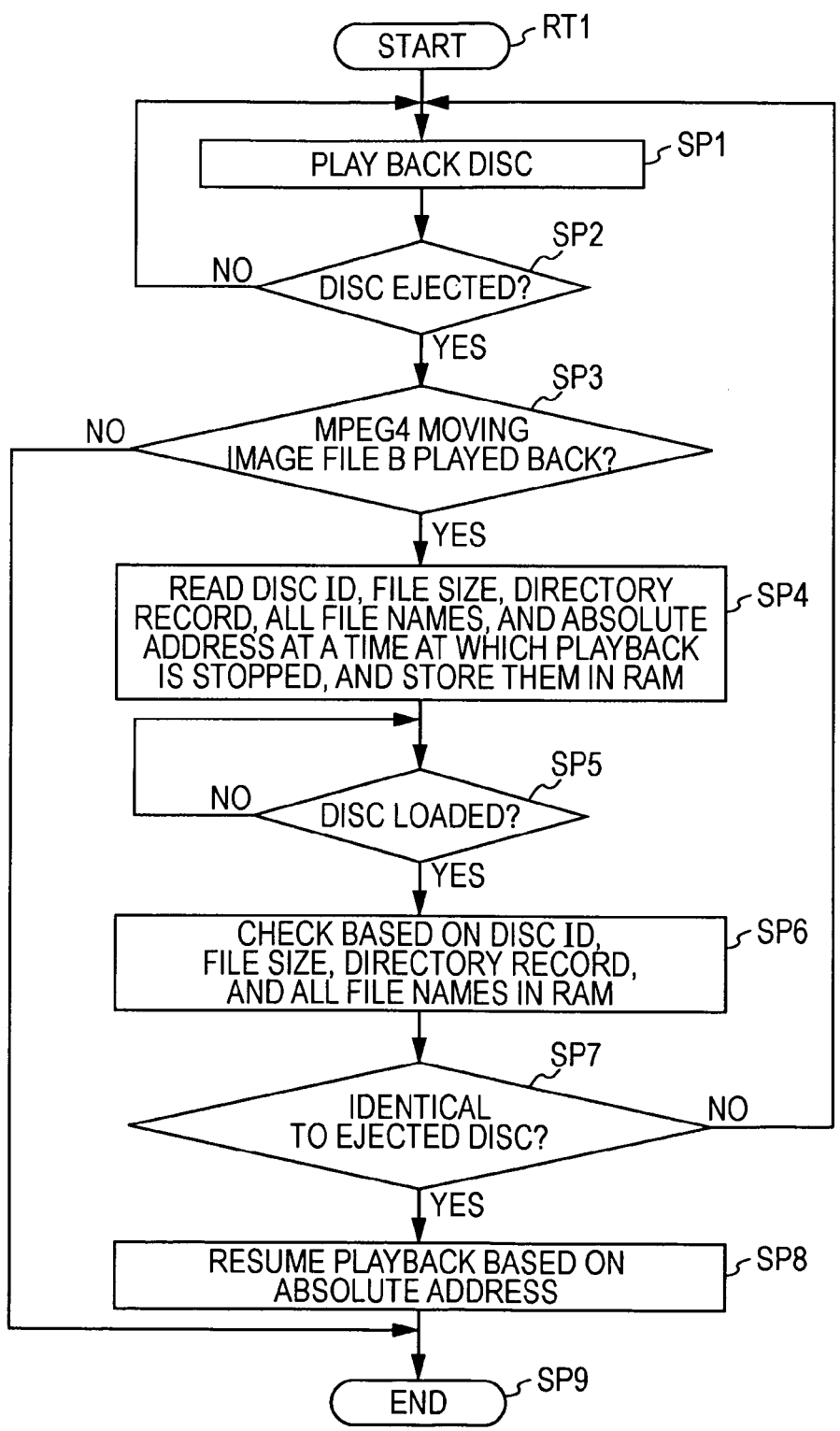
FIG. 4 is a flowchart showing a basic procedure to resume playback processing according to the first embodiment.

Next, a basic procedure to resume playback processing by which the system control microcomputer 7 (hereinafter, simply referred to as the microcomputer 7) of the car DVD player 1 resumes playback processing from a point at which the playback of the disc Di1 was stopped will be described with reference to a flowchart in FIG. 4.

The microcomputer 7 of the car DVD player 1 starts from a start step of a routine RT1, proceeds to the next step SP1, where the microcomputer 7 starts playback processing of the disc Di1, and proceeds to the next step SP2.

In step SP2, the microcomputer 7 determines whether or not the microcomputer 7 has caused the disc Di1 to be ejected from the main body 2 after having stopped the playback processing of the disc Di1 in response to an eject command given by the user through the operation keys 10.

If the result of the determination is No in this step, this indicates that an eject command has not been given and the disc Di1 has not been ejected from the main body 2. In this case, the microcomputer 7 goes back to step SP1 and continues the playback processing of the disc Di1.

On the other hand, if the result of the determination is Yes in step SP2, this indicates that the disc Di1 has been ejected from the main body 2 in response to an eject command from the user. In this case, the microcomputer 7 proceeds to the next step SP3.

In step SP3, the microcomputer 7 determines whether or not the file which had been played back until the disc Di1 was ejected is the MPEG4 moving image file B by referring to the extension of the file.

Figures 2, 5:
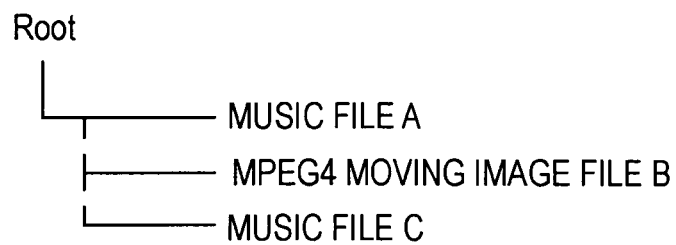
FIG. 2 is a schematic diagram for explaining a directory configuration according to the first to third embodiments.
FIG. 5 is a table showing combinations of files and extensions according to the first to third embodiments.

As shown in FIG. 5, if the file is the music file A or the music file C, ".wav", "m4a", "m2a", "ac3", or the like is attached to the file name as its extension. If the file is the MPEG4 moving image file B, ".AVI", "mp4", or the like is attached to the file name as its extension.

If the result of the determination is No in step SP3, this indicates that the file which had been played back until the ejection is the music file A or the music file C, not the MPEG4 moving image file B. In this case, the microcomputer 7 proceeds to step SP9, and ends the processing.

Incidentally, when the file which had been played back until the disc Di1 was ejected is the music file A or the music file C, playback processing is not resumed from a point at which the playback was stopped.

This is because the length of the music file A or the music file C is equivalent to that of a single piece of music, which is usually about 5 minutes, and even when playback processing is performed from the beginning instead of resuming playback processing from a point at which the playback was stopped, the length of a part that is redundantly played back is short. Moreover, as far as the music files A and C are concerned, it is more convenient for the user to perform playback processing from the beginning than to resume playback processing from a point at which the playback was stopped.

However, the length of the MPEG4 moving image file B is equivalent to, for example, a movie of about 2 hours. Suppose that a point at which the playback was stopped is the point at 1 hour and 50 minutes from the beginning. In such a case, if playback processing is performed from the beginning, a part that is redundantly played back is very long and the user is forced to perform fast-forwarding.

On the other hand, if the result of the determination is Yes in step SP3, this indicates that the file which had been played back until the ejection is the MPEG4 moving image file B, and it is necessary to resume playback processing from a point at which the playback was stopped. In this case, the microcomputer 7 proceeds to the next step SP4.

In step SP4, at a time at which playback processing is stopped and ejection is performed, the microcomputer 7 reads the disc ID and the file size in the read-in area AR1 and the directory record, all file names, and all absolute addresses corresponding to all files in the directory record area AR2, stores them in the RAM 8, and proceeds to the next step SP5.

Incidentally, the RAM 8 has enough capacity to store the disc IDs, the file sizes, the directory record, all file names, and the absolute addresses of ten discs.

In step SP5, the microcomputer 7 determines whether or not another disc is newly loaded into the main body 2. If the result of the determination is No, the microcomputer 7 goes back to step SP5, and waits until the disc is newly loaded; if the result of the determination is Yes, the microcomputer 7 proceeds to the next step SP6.

In step SP6, the microcomputer 7 checks the newly loaded disc against the disc ID, the file size, the directory record, and all file names stored in the RAM 8 in step SP4, and proceeds to the next step SP7.

At this time, the microcomputer 7 checks whether or not the disc ID, the file size, the directory record, and all file names, which are stored in the RAM 8, match those of the disc Di1 ejected in step SP2.

On the basis of the check result, in step SP7, the microcomputer 7 determines whether or not the newly loaded disc is the disc Di1 ejected in step SP2.

If the result of the determination is No in this step, this indicates that the newly loaded disc is the disc Di2 (FIG. 1) and is different from the ejected disc Di1. In this case, the microcomputer 7 goes back to step SP1, starts playback processing of the disc Di2, and performs the processing that follows in the same manner as described above.

On the other hand, if the result of the determination is Yes in step SP7, this indicates that the newly loaded disc is the disc Di1 ejected in step SP2, and that the disc Di1 is loaded again. In this case, the microcomputer 7 proceeds to the next step SP8.

In step SP8, since the disc Di1 ejected once is loaded again, the microcomputer 7 resumes playback processing of the MPEG4 moving image file B on the basis of the absolute address (in this case, address "500") corresponding to the point X that is stored in the RAM 8, proceeds to the next step SP9, and ends the processing.

As a result, when the disc Di1 is ejected during the playback of the MPEG4 moving image file B and is loaded again, the microcomputer 7 of the car DVD player 1 can resume playback processing immediately by using the absolute address corresponding to the point X that is stored in the RAM 8 as a playback point, making it possible to provide the user with only the subsequent video images with no redundant part included.

1-5. Operation and Effects

In the above configuration, when the disc Di1 which is being played back by the laser pickup 3 is ejected, if the content to be played back is the MPEG4 moving image file B contained in the disc Di1, the microcomputer 7 of the car DVD player 1 performs the following processing.

At a time at which playback processing is stopped and ejection is performed, the microcomputer 7 of the car DVD player 1 reads the disc ID and the file size in the read-in area AR1 and the directory record, all file names, and all absolute addresses corresponding to all files in the directory record area AR2, and stores and holds them in the RAM 8.

Then, when a new disc is loaded, the microcomputer 7 of the car DVD player 1 determines whether or not the new disc is identical to the previously ejected disc Di1 on the basis of the disc ID, the file size, the directory record, and all file names stored in the RAM 8.

If the microcomputer 7 of the car DVD player 1 determines that the newly loaded disc is the new disc Di2 different from the previously ejected disc Di1, the microcomputer 7 starts playback processing of the new next disc Di2 from the beginning in the usual manner.

On the other hand, if the microcomputer 7 of the car DVD player 1 determines that the newly loaded disc is identical to the previously ejected disc Di1, the microcomputer 7 reads the absolute address (the address "500") corresponding to the point X that is stored in the RAM 8, and resumes playback processing from that address.

As a result, the microcomputer 7 of the car DVD player 1 can provide the user with playback results of the MPEG4 moving image file B which the user had been viewing until ejection from the subsequent scenes with no overlaps.

In this way, even when the disc Di1 containing the MPEG4 moving image file B which has no concept of "title" and "chapter", in which no information on playback time is written, and which is stored in one file, is ejected and then loaded again, the car DVD player 1 can resume playback processing of the MPEG4 moving image file B immediately from a point at which the playback was stopped at the time of ejection without forcing the user to perform fast-forwarding.

With the above configuration, even when the disc Di1 is ejected during the playback of the MPEG4 moving image file B contained in the disc Di1 and is then loaded again, the car DVD player 1 can resume playback processing immediately from a point at which the playback of the MPEG4 moving image file B stored in one file was stopped.

2. Second Embodiment

2-1. Configuration of a Car DVD Player

Since a car DVD player according to a second embodiment has the same configuration as the car DVD player 1 according to the first embodiment shown in FIG. 1, the description thereof will be omitted here for convenience sake.

2-2. Directory Configuration

Moreover, a directory configuration of the disc Di1 used as an object to be played back is also the same as that shown in FIG. 2, and the description thereof will be omitted here.

2-3. Data Structure

Figure 3:
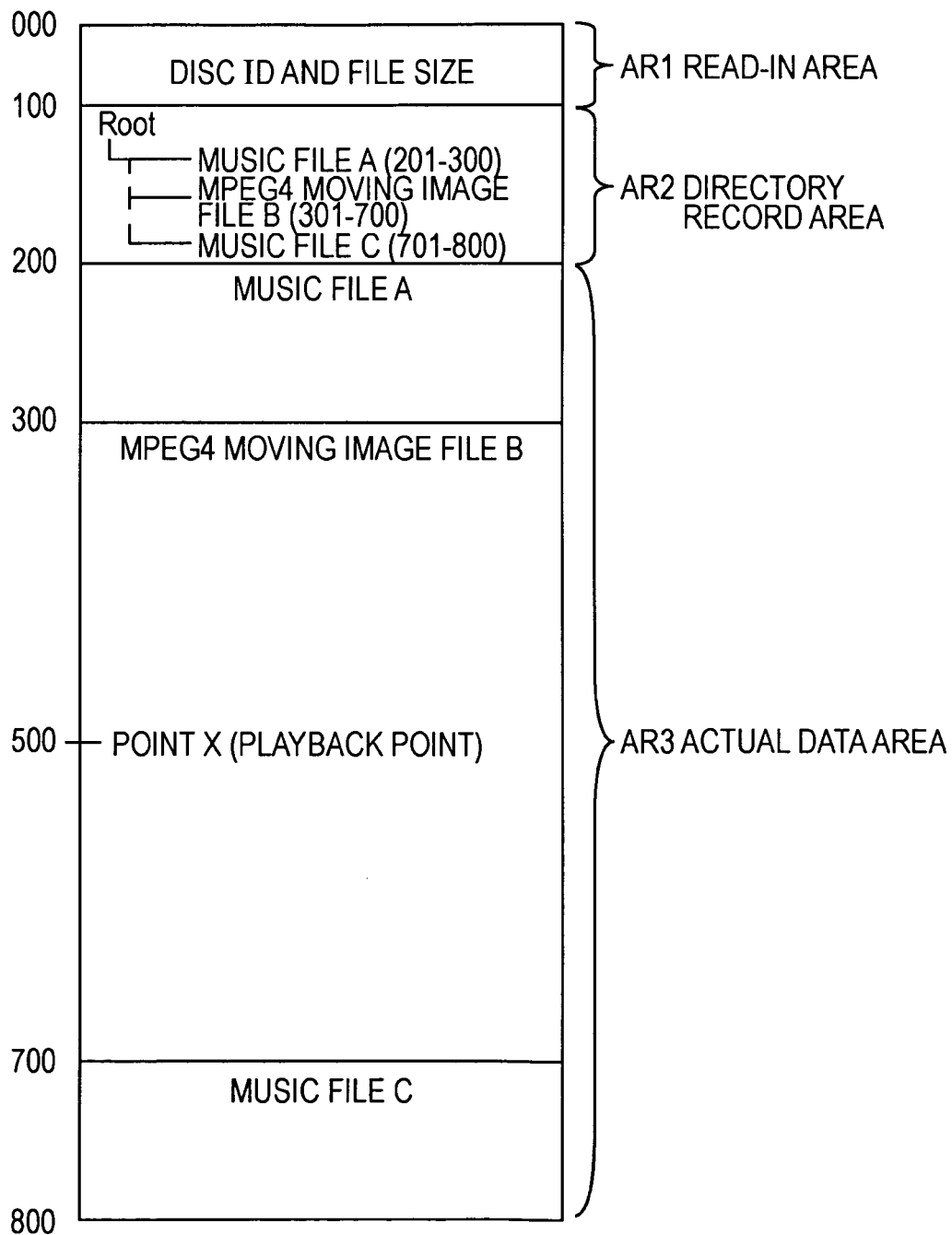
FIG. 3 is a schematic diagram for explaining a playback point according to the first embodiment.
Figure 6:
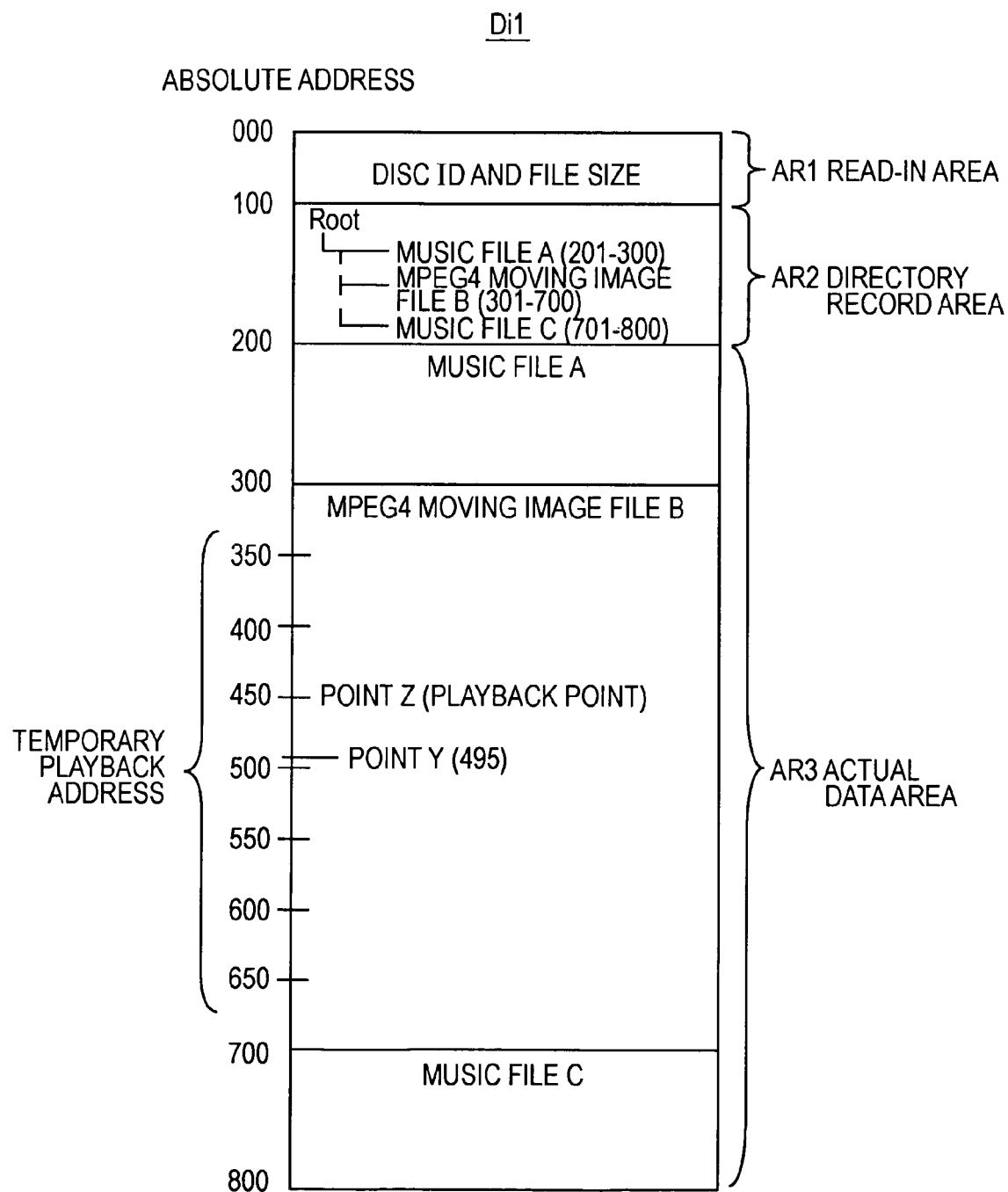
FIG. 6 is a schematic diagram for explaining a playback point according to the second embodiment.

Next, as for a data structure of data stored in the disc Di1, as shown in FIG. 6 in which such parts as are found also in FIG. 3 are identified with the same reference numerals or letters, the data structure is identical to that of FIG. 3, and therefore the description thereof will be omitted for convenience sake.

Here, the car DVD player 1 according to the second embodiment resumes playback processing of the MPEG4 moving image file B from an address that is based on absolute address "495" corresponding to, for example, a point Y of the disc Di1 but is not exactly the absolute address "495", more specifically, from the following temporary playback address.

That is, in the car DVD player 1, a plurality of temporary playback addresses (absolute addresses "350", "400", "450", "500", "550", "600", and "650") are set in the range of absolute address "301" to absolute address "700" for the MPEG4 moving image file B by evenly dividing the range at even intervals in advance.

Then, the car DVD player 1 resumes playback processing of the MPEG4 moving image file B from a playback point at a temporary playback address (in this case, absolute address "450" corresponding to a point Z) which is earlier than the absolute address "495" corresponding to the point Y and is closest to the absolute address "495" corresponding to the point Y.

As a result, the car DVD player 1 can resume playback processing, not from an exact point at which playback processing of the MPEG4 moving image file B was stopped, but from a playback point at a predetermined temporary playback address which is earlier by a short time than the exact point at which playback processing of the MPEG4 moving image file B was stopped. This allows the user to remember the last scene just before the playback was stopped and then view the subsequent scenes.

Figure 7:
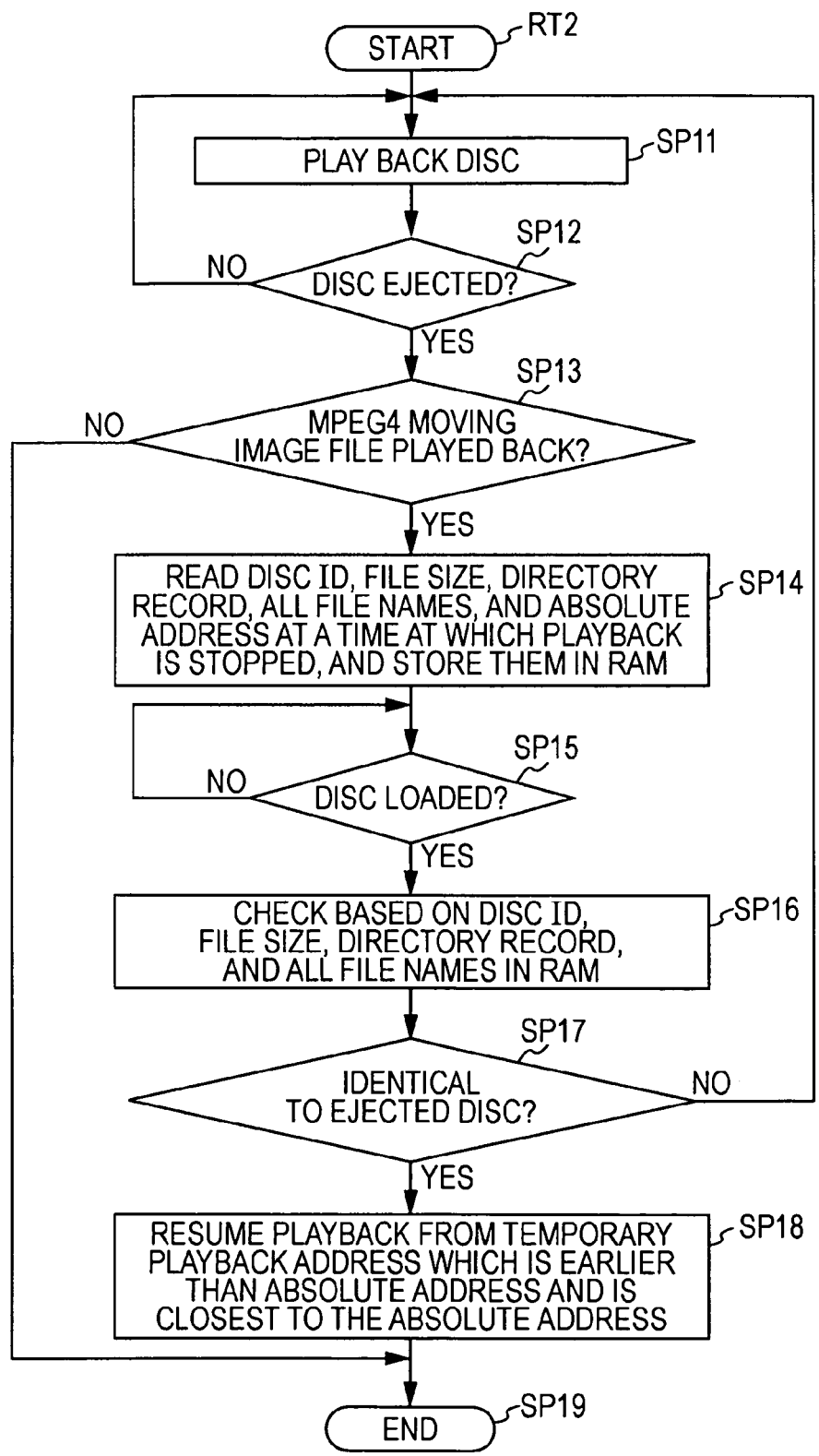
FIG. 7 is a flowchart showing a procedure to resume playback processing from a temporary playback address according to the second embodiment.

2-4. Procedure to Resume Playback Processing from a Temporary Playback Address Next, a procedure to resume playback processing by which the microcomputer 7 of the car DVD player 1 resumes playback processing from a temporary playback address based on a point at which playback of the disc Di1 was stopped will be described with reference to a flowchart in FIG. 7.

The microcomputer 7 of the car DVD player 1 starts from a start step of a routine RT2, proceeds to the next step SP11, where the microcomputer 7 starts playback processing of the disc Di1, and proceeds to the next step SP12.

In step SP12, the microcomputer 7 determines whether or not the microcomputer 7 has caused the disc Di1 to be ejected from the main body 2 after having stopped the playback processing of the disc Di1 in response to an eject command given by the user through the operation keys 10.

If the result of the determination is No in this step, this indicates that an eject command has not been given and the disc Di1 has not been ejected from the main body 2. In this case, the microcomputer 7 goes back to step SP11 and continues the playback processing of the disc Di1.

On the other hand, if the result of the determination is Yes in step SP12, this indicates that the disc Di1 has been ejected from the main body 2 in response to an eject command from the user. In this case, the microcomputer 7 proceeds to the next step SP13.

In step SP13, the microcomputer 7 determines whether or not the file which had been played back until the disc Di1 was ejected is the MPEG4 moving image file B by referring to the extension of the file as shown in FIG. 5.

If the result of the determination is No in step SP13, this indicates that the file which had been played back until the ejection is the music file A or the music file C, not the MPEG4 moving image file B. In this case, the microcomputer 7 proceeds to step SP19, and ends the processing.

Incidentally, when the file which had been played back until the disc Di1 was ejected is the music file A or the music file C, playback processing is not resumed from a point at which the playback was stopped.

This is because the length of the music file A or the music file C is equivalent to that of a single piece of music, which is usually about 5 minutes, and even when playback processing is performed from the beginning instead of resuming playback processing from a point at which the playback was stopped, the length of a part that is redundantly played back is short. Moreover, as far as the music files A and C are concerned, it is more convenient for the user to perform playback processing from the beginning than to resume playback processing from a point at which the playback was stopped.

However, the length of the MPEG4 moving image file B is equivalent to, for example, a movie of about 2 hours. Suppose that a point at which the playback was stopped is the point at 1 hour and 50 minutes from the beginning. In such a case, if playback processing is performed from the beginning, a part that is redundantly played back is very long and the user is forced to perform fast-forwarding.

On the other hand, if the result of the determination is Yes in step SP13, this indicates that the file which had been played back until the ejection is the MPEG4 moving image file B, and it is necessary to resume playback processing from a point at which the playback was stopped. In this case, the microcomputer 7 proceeds to the next step SP14.

In step SP14, at a time at which playback processing is stopped and ejection is performed, the microcomputer 7 reads the disc ID and the file size in the read-in area AR1 and the directory record, all file names, and all absolute addresses corresponding to all files in the directory record area AR2, stores them in the RAM 8, and proceeds to the next step SP15.

In step SP15, the microcomputer 7 determines whether or not another disc is newly loaded into the main body 2. If the result of the determination is No, the microcomputer 7 goes back to step SP15, and waits until the disc is newly loaded; if the result of the determination is Yes, the microcomputer 7 proceeds to the next step SP16.

In step SP16, the microcomputer 7 checks the newly loaded disc against the disc ID, the file size, the directory record, and all file names stored in the RAM 8 in step SP14, and proceeds to the next step SP17.

At this time, the microcomputer 7 checks whether or not the disc ID and the file size, the directory record, and all file names in the directory record area AR2, which are stored in the RAM 8, match those of the disc Di1 ejected in step SP12.

On the basis of the check result, in step SP17, the microcomputer 7 determines whether or not the newly loaded disc is the disc Di1 ejected in step SP12.

If the result of the determination is No in this step, this indicates that the newly loaded disc is the disc Di2 (FIG. 1) and is different from the ejected disc Di1. In this case, the microcomputer 7 goes back to step SP11, starts playback processing of the disc Di2, and performs the processing that follows in the same manner as described above.

On the other hand, if the result of the determination is Yes in step SP17, this indicates that the newly loaded disc is the disc Di1 ejected in step SP12, and that the disc Di1 is loaded again. In this case, the microcomputer 7 proceeds to the next step SP18.

In step SP18, since the disc Di1 ejected once is loaded again, the microcomputer 7 resumes playback processing of the MPEG4 moving image file B from a playback point at a temporary playback address (absolute address "450" corresponding to the point Z) which is earlier than the absolute address (in this case, absolute address "495") corresponding to the point Y that is stored in the RAM 8 and closest to the absolute address corresponding to the point Y, proceeds to the next step SP19, and ends the processing.

As a result, when the disc Di1 is ejected during the playback of the MPEG4 moving image file B and is loaded again, the microcomputer 7 of the car DVD player 1 can resume playback processing immediately on the basis of a temporary playback address which is earlier than and closest to an absolute address corresponding to the point Y that is stored in the RAM 8, making it possible to provide the user with playback video images containing a small redundant part.

2-5. Operation and Effects

In the above configuration, when the disc Di1 which is being played back by the laser pickup 3 is ejected, if the content to be played back is the MPEG4 moving image file B contained in the disc Di1, the microcomputer 7 of the car DVD player 1 performs the following processing.

At a time at which playback processing is stopped and ejection is performed, the microcomputer 7 of the car DVD player 1 reads the disc ID and the file size in the read-in area AR1 and the directory record, all file names, and all absolute addresses corresponding to all files in the directory record area AR2, and stores and holds them in the RAM 8.

Then, when a new disc is loaded, the microcomputer 7 of the car DVD player 1 determines whether or not the new disc is identical to the previously ejected disc Di1 on the basis of the disc ID, the file size, the directory record, and all file names stored in the RAM 8.

If the microcomputer 7 of the car DVD player 1 determines that the newly loaded disc is the new disc Di2 different from the previously ejected disc Di1, the microcomputer 7 starts playback processing of the new next disc Di2 from the beginning in the usual manner.

On the other hand, if the microcomputer 7 of the car DVD player 1 determines that the newly loaded disc is identical to the previously ejected disc Di1, the microcomputer 7 performs the following processing.

The microcomputer 7 of the car DVD player 1 reads an absolute address corresponding to the point Y that is stored in the RAM 8, and resumes playback processing of the MPEG4 moving image file B from a playback point at a temporary playback address (absolute address "450" corresponding to the point Z) which is earlier than and closest to the absolute address corresponding to the point Y.

As a result, the microcomputer 7 of the car DVD player 1 allows the user to view playback video images of the MPEG4 moving image file B which the user had been viewing until ejection, with a redundant part included, from a temporary playback address which is slightly earlier than a point at which the playback was stopped.

In this way, by providing the user with the playback video images containing a small redundant part from a temporary playback address which is earlier than the point at which the playback was stopped, the microcomputer 7 of the car DVD player 1 can cause the user to remember the last scene which the user had been viewing before ejection and view the subsequent playback video images without feeling abruptness.

In this way, even when the disc Di1 containing the MPEG4 moving image file B which has no concept of "title" and "chapter", in which no information on playback time is written, and which is stored in one file, is ejected and then loaded again, the car DVD player 1 allows the user to view the subsequent playback results of the MPEG4 moving image file B immediately while maintaining the continuity with the scene in the user's memory without forcing the user to perform fast-forwarding.

In addition, by using a playback point at a temporary playback address which is earlier than the absolute address corresponding to the point Y that is stored in the RAM 8 and closest to the absolute address of the point Y, the microcomputer 7 of the car DVD player 1 can minimize the redundant part while maintaining the continuity with the scene in the user's memory.

Furthermore, by setting a plurality of temporary playback addresses in the range of absolute address "301" to absolute address "700" for the MPEG4 moving image file B by evenly dividing the range at even intervals in advance and using one of these temporary playback addresses as a playback point for the resumption of playback processing, the car DVD player 1 can reduce processing load on the microcomputer 7 and achieve immediate resumption of playback processing.

With the above configuration, even when the disc Di1 is ejected during the playback of the MPEG4 moving image file B contained in the disc Di1 and is then loaded again, the car DVD player 1 can resume playback processing immediately from a point located near a point at which the playback of the MPEG4 moving image file B stored in one file was stopped.

3. Third Embodiment 3-1. Configuration of a Car DVD Player

Since a car DVD player according to a third embodiment has the same configuration as the car DVD player 1 according to the first embodiment shown in FIG. 1, the description thereof will be omitted here for convenience sake.

3-2. Directory Configuration

Moreover, a directory configuration of the disc Di1 used as an object to be played back is also the same as that shown in FIG. 2, and the description thereof will be omitted here.

3-3. Data Structure

Figure 8:
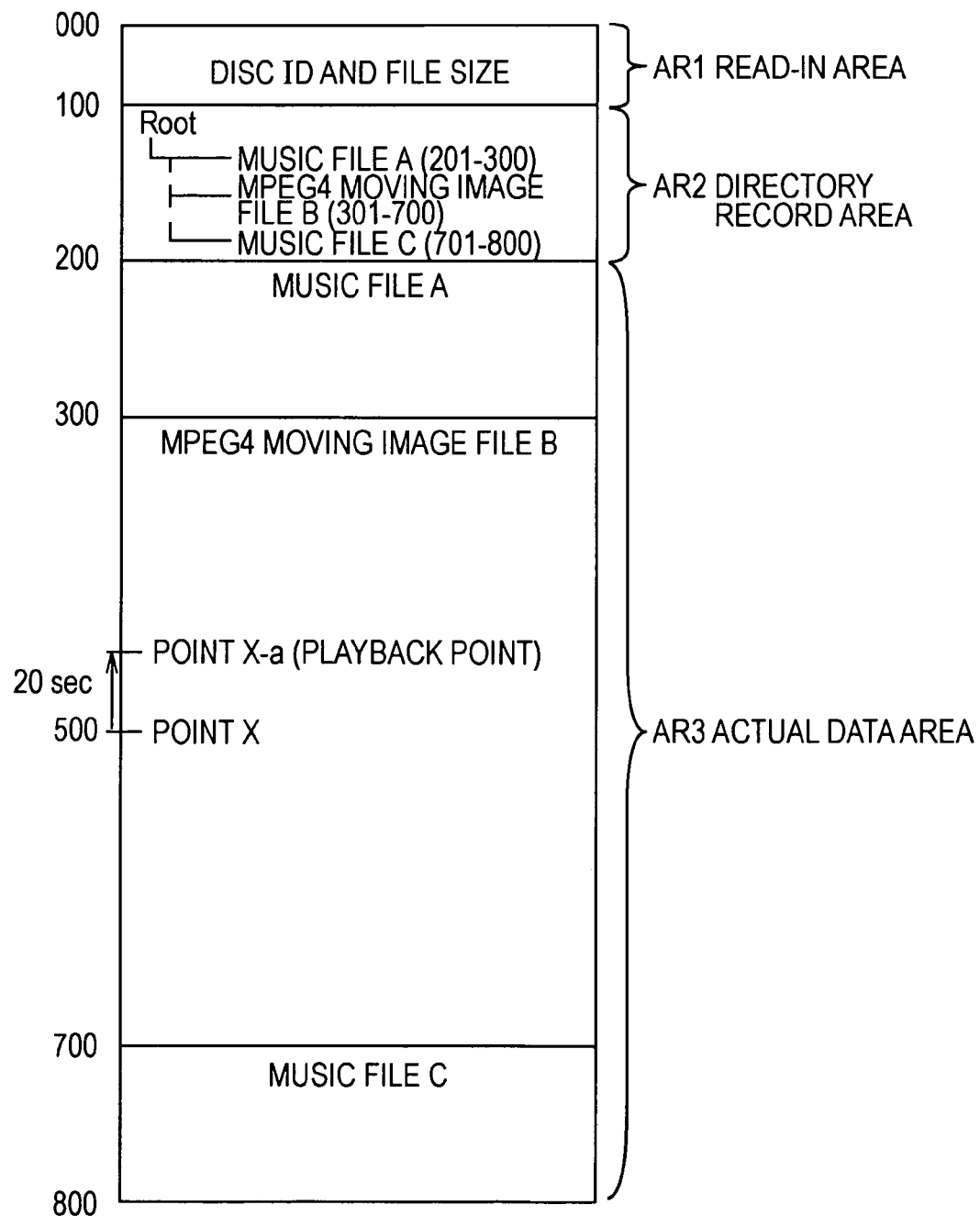
FIG. 8 is a schematic diagram for explaining a playback point according to the third embodiment.

Next, as for a data structure of data stored in the disc Di1, as shown in FIG. 8 in which such parts as are found also in FIG. 3 are identified with the same reference numerals or letters, the data structure is identical to that of FIG. 3, and therefore the description thereof will be omitted for convenience sake.

Here, the car DVD player 1 according to the third embodiment does not resume playback processing exactly from absolute address "500" corresponding to, for example, the point X of the disc Di1, but resumes playback processing from an absolute address corresponding to a time point X−a, which is a predetermined time "a" (for example, 20 [sec]) earlier than the point X, as described below.

As a result, the car DVD player 1 can resume playback processing, not from an exact point at which playback processing of the MPEG4 moving image file B was stopped, but from the predetermined time point X−a, which is the predetermined time "a" earlier than the exact point at which playback processing of the MPEG4 moving image file B was stopped. This allows the user to remember the last scene just before the playback was stopped and then view the subsequent scenes.

Figure 9:
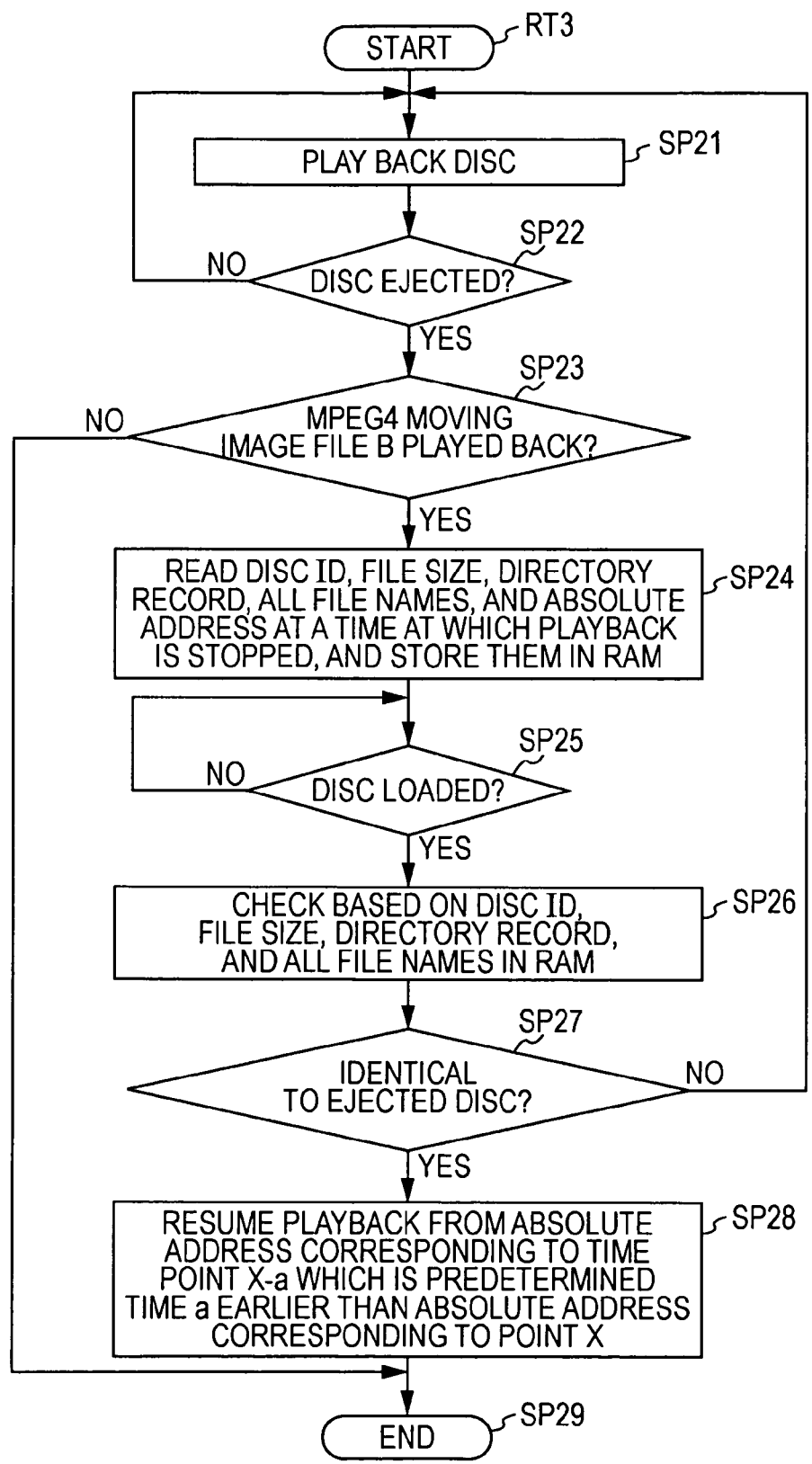
FIG. 9 is a flowchart showing a procedure to resume playback processing from a time point earlier by a predetermined time according to the third embodiment.

3-4. Procedure to Resume Playback Processing from a Time Point Earlier by a Predetermined Time Next, a procedure to resume playback processing by which the microcomputer 7 of the car DVD player 1 resumes playback processing from the time point X−a, which is the predetermined time "a" earlier than a point at which playback of the disc Di1 was stopped will be described with reference to a flowchart in FIG. 9.

The microcomputer 7 of the car DVD player 1 starts from a start step of a routine RT3, proceeds to the next step SP21, where the microcomputer 7 starts playback processing of the disc Di1, and proceeds to the next step SP22.

In step SP22, the microcomputer 7 determines whether or not the microcomputer 7 has caused the disc Di1 to be ejected from the main body 2 after having stopped the playback processing of the disc Di1 in response to an eject command given by the user through the operation keys 10.

If the result of the determination is No in this step, this indicates that an eject command has not been given and the disc Di1 has not been ejected from the main body 2. In this case, the microcomputer 7 goes back to step SP21 and continues the playback processing of the disc Di1.

On the other hand, if the result of the determination is Yes in step SP22, this indicates that the disc Di1 has been ejected from the main body 2 in response to an eject command from the user. In this case, the microcomputer 7 proceeds to the next step SP23.

In step SP23, the microcomputer 7 determines whether or not the file which had been played back until the disc Di1 was ejected is the MPEG4 moving image file B by referring to the extension of the file as shown in FIG. 5.

If the result of the determination is No in step SP23, this indicates that the file which had been played back until the ejection is the music file A or the music file C, not the MPEG4 moving image file B. In this case, the microcomputer 7 proceeds to step SP29, and ends the processing.

Incidentally, when the file which had been played back until the disc Di1 was ejected is the music file A or the music file C, playback processing is not resumed from a point at which the playback was stopped.

This is because the length of the music file A or the music file C is equivalent to that of a single piece of music, which is usually about 5 minutes, and even when playback processing is performed from the beginning instead of resuming playback processing from a point at which the playback was stopped, the length of a part that is redundantly played back is short. Moreover, as far as the music files A and C are concerned, it is more convenient for the user to perform playback processing from the beginning than to resume playback processing from a point at which the playback was stopped.

However, the length of the MPEG4 moving image file B is equivalent to, for example, a movie of about 2 hours. Suppose that a point at which the playback was stopped is the point at 1 hour and 50 minutes from the beginning. In such a case, if playback processing is performed from the beginning, a part that is redundantly played back is very long and the user is forced to perform fast-forwarding.

On the other hand, if the result of the determination is Yes in step SP23, this indicates that the file which had been played back until the ejection is the MPEG4 moving image file B, and it is necessary to resume playback processing from a point at which the playback was stopped. In this case, the microcomputer 7 proceeds to the next step SP24.

In step SP24, at a time at which playback processing is stopped and ejection is performed, the microcomputer 7 reads the disc ID and the file size in the read-in area AR1 and the directory record, all file names, and all absolute addresses corresponding to all files in the directory record area AR2, stores them in the RAM 8, and proceeds to the next step SP25.

In step SP25, the microcomputer 7 determines whether or not another disc is newly loaded into the main body 2. If the result of the determination is No, the microcomputer 7 goes back to step SP25, and waits until the disc is newly loaded; if the result of the determination is Yes, the microcomputer 7 proceeds to the next step SP26.

In step SP26, the microcomputer 7 checks the newly loaded disc against the disc ID, the file size, the directory record, and all file names stored in the RAM 8 in step SP24, and proceeds to the next step SP27.

At this time, the microcomputer 7 checks whether or not the disc ID and the file size, the directory record, and all file names in the directory record area AR2, which are stored in the RAM 8, match those of the disc Di1 ejected in step SP22.

On the basis of the check result, in step SP27, the microcomputer 7 determines whether or not the newly loaded disc is the disc Di1 ejected in step SP22.

If the result of the determination is No in this step, this indicates that the newly loaded disc is the disc Di2 (FIG. 1) and is different from the ejected disc Di1. In this case, the microcomputer 7 goes back to step SP21, starts playback processing of the disc Di2, and performs the processing that follows in the same manner as described above.

On the other hand, if the result of the determination is Yes in step SP27, this indicates that the newly loaded disc is the disc Di1 ejected in step SP22, and that the disc Di1 is loaded again. In this case, the microcomputer 7 proceeds to the next step SP28.

In step SP28, since the disc Di1 ejected once is loaded again, the microcomputer 7 resumes playback processing of the MPEG4 moving image file B from an absolute address corresponding to the time point X−a, which is the predetermined time "a" earlier than an absolute address (in this case, the address "500") corresponding to the point X that is stored in the RAM 8, proceeds to the next step SP29, and ends the processing.

As a result, when the disc Di1 is ejected during the playback of the MPEG4 moving image file B and is loaded again, the microcomputer 7 of the car DVD player 1 can resume playback processing immediately on the basis of an absolute address corresponding to the time point X−a, which is the predetermined time "a" earlier than the point X that is stored in the RAM 8, making it possible to provide the user with playback video images containing a small redundant part at the beginning.

3-5. Operation and Effects

In the above configuration, when the disc Di1 which is being played back by the laser pickup 3 is ejected, if the content to be played back is the MPEG4 moving image file B contained in the disc Di1, the microcomputer 7 of the car DVD player 1 performs the following processing.

At a time at which playback processing is stopped and ejection is performed, the microcomputer 7 of the car DVD player 1 reads the disc ID and the file size in the read-in area AR1 and the directory record, all file names, and all absolute addresses corresponding to all files in the directory record area AR2, and stores and holds them in the RAM 8.

Then, when a new disc is loaded, the microcomputer 7 of the car DVD player 1 determines whether or not the new disc is identical to the previously ejected disc Di1 on the basis of the disc ID, the file size, the directory record, and all file names stored in the RAM 8.

If the microcomputer 7 of the car DVD player 1 determines that the newly loaded disc is the new disc Di2 different from the previously ejected disc Di1, the microcomputer 7 starts playback processing of the new next disc Di2 from the beginning in the usual manner.

On the other hand, if the microcomputer 7 of the car DVD player 1 determines that the newly loaded disc is identical to the previously ejected disc Di1, the microcomputer 7 performs the following processing.

The microcomputer 7 of the car DVD player 1 reads the absolute address corresponding to the point X that is stored in the RAM 8, and resumes playback processing of the MPEG4 moving image file B by using an absolute address corresponding to the time point X−a, which is the predetermined time "a" earlier than the point X, as a playback point.

As a result, the microcomputer 7 of the car DVD player 1 allows the user to view playback video images of the MPEG4 moving image file B which the user had been viewing until ejection, with a redundant part included, from an absolute address corresponding to the time point X−a, which is slightly earlier than a point at which the playback was stopped.

In this way, by allowing the user to view the playback video images containing a small redundant part from an absolute address corresponding to the time point X−a, which is earlier than the point at which the playback was stopped, the microcomputer 7 of the car DVD player 1 can cause the user to remember the last scene which the user had been viewing before ejection and provide the user with the subsequent playback video images without causing the user to feel abruptness.

In this way, even when the disc Di1 containing the MPEG moving image file B which has no concept of "title" and "chapter", in which no information on playback time is written, and which is stored in one file, is ejected and then loaded again, the car DVD player 1 allows the user to view the subsequent playback results of the MPEG4 moving image file B immediately while maintaining the continuity with the scene in the user's memory without forcing the user to perform fast-forwarding.

In addition, by using an absolute address corresponding to the time point X−a, which is the predetermined time "a" earlier than the absolute address corresponding to the point X that is stored in the RAM 8 as a playback point, the microcomputer 7 of the car DVD player 1 can minimize the redundant part while maintaining the continuity with the scene in the user's memory.

With the above configuration, even when the disc Di1 is ejected during the playback of the MPEG4 moving image file B contained in the disc Di1 and is then loaded again, the car DVD player 1 can resume playback processing immediately from a point located near a point at which the playback of the MPEG4 moving image file B stored in one file was stopped.

4. Other Embodiments

Here, the above-described first to third embodiments deal with cases in which an object to be played back is the DVD disc Di1 in which an MPEG4 moving image file is stored as the moving image content.

However, the present invention is not limited to this, and the object to be played back may be various kinds of other removable recording media in which an MPEG4 moving image file is stored, such as a Blu-ray disc, a USB memory, or a removable hard disk.

Moreover, the above-described first to third embodiments deal with cases in which the MPEG4 moving image file B as the moving image content and the music files A and C as other contents are stored in the disc Di1 together.

However, the present invention is not limited to the above cases. An audio file that can be played back may be stored in the disc Di1 as other contents stored therein together with the MPEG4 moving image file B.

Furthermore, the above-described second embodiment deals with a case in which a plurality of temporary playback addresses are set in the range of absolute address "301" to absolute address "700" for the MPEG4 moving image file B by evenly dividing the range at even intervals of "50" addresses in advance.

However, the present invention is not limited to this, and a plurality of temporary playback addresses may be set in the range of absolute address "301" to absolute address "700" for the MPEG4 moving image file B by evenly dividing the range at even intervals of "10", "25", or "100" addresses in advance.

In addition, the above-described third embodiment deals with a case in which an absolute address corresponding to the time point X−a, which is the predetermined time "a" (for example, 20 [sec]) earlier than the point X is used.

However, the present invention is not limited to this, and an absolute address corresponding to the time point X−a, which is the predetermined time "a" (for example, 10 [sec], 30 [sec], or 50 [sec]) earlier than the point X may be used.

Moreover, the above-described embodiment deals with a case in which playback processing of the MPEG4 moving image file B is resumed from an absolute address corresponding to the time point X−a, which is the predetermined time "a" earlier than the point X.

However, the present invention is not limited to this, and playback processing of the MPEG4 moving image file B may be resumed on a buffer from an absolute address corresponding to the time point X−a, which is the predetermined time "a" earlier than the point X, and playback results may be output from a time point at which the audio level of the playback results exceeds a predetermined threshold value.

In this case, the microcomputer 7 can output playback video images from a part in which the audio level exceeds a predetermined threshold value, that is, from an exciting scene in the MPEG4 moving image file B. This helps the user to remember the contents easily, and allows the user to view the subsequent playback video images smoothly.

Furthermore, the above-described first to third embodiments deal with cases in which the microcomputer 7 of the car DVD player 1 performs the aforementioned procedures to resume playback processing of the routines RT1 to RT3 according to a previously installed application program.

However, the present invention is not limited to this, and the aforementioned procedures to resume playback processing of the routines RT1 to RT3 may be performed according to an application program installed from a predetermined recording medium, an application program downloaded from the Internet, or an application program installed via various other routes.

In addition, the above-described embodiments deal with cases in which the MPEG4 moving image file B is used as the moving image content stored in one file. However, the present invention is not limited to this, and a moving image file which is stored in one file and is subjected to high compression coding by a predetermined method may be used.

Moreover, the above-described embodiments deal with cases in which the laser pickup 3 and the MPEG decoder 4 configured as playback means and the microcomputer 7 configured as storage controlling means, determining means, and controlling means constitute the car DVD player 1 configured as the playback apparatus according to the present invention.

However, the present invention is not limited to this, and the playback means, the storage controlling means, the determining means, and the controlling means configured in different ways may constitute the car DVD player 1 configured as the playback apparatus according to the present invention.

INDUSTRIAL APPLICABILITY

The playback apparatus and the playback method according to the present invention are applicable not only to the car DVD players but also to various other electronic devices such as home audio devices, personal computers, mobile phones, and game devices which are capable of playing back removable recording media such as DVDs and Blu-ray discs.

REFERENCE SIGNS LIST

1 . . . car DVD player, 2 . . . main body, 3 . . . laser pickup, 4 . . . MPEG decoder, 5 . . . electronic volume control, 6 . . . power amplifier, 7 . . . system control microcomputer, 8 . . . RAM, 9 . . . display panel, 10 . . . operation key, 11 . . . LCD, 12 . . . speaker, T1, T2 . . . output terminal, Di1, Di2 . . . disc

The invention claimed is:

1. A playback apparatus comprising:
playback means for playing back a removable recording medium in which a moving image content stored in one file and another content other than the moving image content are stored, in which the moving image content has an MPEG4 format;
storage controlling means for determining whether or not the moving image content having the MPEG4 format was being played back at a time in which the recording medium is stopped and removed, and for storing a file size of the recording medium, all file names and an absolute address corresponding to the moving image content and the other content in storing means only when a determination result indicates that the moving image content having the MPEG4 format was being played back when the recording medium was stopped and removed;
determining means for determining, when the recording medium is loaded again and the moving image content is played back by the playback means, whether or not the recording medium is identical to the recording medium that was removed by reading the file size and all the file names stored in the storing means; and
controlling means for resuming playback processing of the moving image content on the basis of the absolute address stored in the storing means when the determining means determines that the recording medium is identical to the recording medium that was removed.

2. The playback apparatus according to claim 1, wherein the controlling means resumes playback processing of the moving image content from a temporary playback address that is one of a plurality of temporary playback addresses which are previously set at even intervals for the moving image content, the temporary playback address being earlier than the absolute address and closest to the absolute address.

3. The playback apparatus according to claim 1, wherein the controlling means resumes playback processing of the moving image content from a time point which is a predetermined time earlier than the absolute address.

4. The playback apparatus according to claim 3, wherein the controlling means resumes playback processing of the moving image content on a buffer from a time point which is a predetermined time earlier than the absolute address, and outputs playback results from a time point at which an audio level of the playback results exceeds a predetermined threshold value.

5. The playback apparatus according to claim 1, wherein the determining means determines whether content is the moving image content or the other content on the basis of an extension of each of all file names.

6. A playback method comprising:
a playback step of playing back, by playback means, a removable recording medium in which a moving image content stored in one file and another content other than the moving image content are stored, in which the moving image content has an MPEG4 format;
a storing step of determining whether or not the moving image content having the MPEG4 format was being played back at a time in which the recording medium is stopped and removed, and of storing, by storage controlling means, a file size of the recording medium, all file names and an absolute address corresponding to the moving image content and the other content, in storing means only when a determination result indicates that the moving image content having the MPEG4 format was being played back when the recording medium was stopped and removed;
a determining step of determining, by determining means, when the recording medium is loaded again and the moving image content is played back by the playback means, whether or not the recording medium is identical to the recording medium that was removed by reading the file size and all the file names stored in the storing means; and
a controlling step of resuming playback processing of the moving image content by controlling means on the basis of the absolute address stored in the storing means when the determining means determines that the recording medium is identical to the recording medium that was removed.

7. The playback apparatus according to claim 6, wherein the controlling step resumes playback processing of the moving image content from a temporary playback address that is one of a plurality of temporary playback addresses which are previously set at even intervals for the moving image content, the temporary playback address being earlier than the absolute address and closest to the absolute address.

8. The playback apparatus according to claim 6, wherein the controlling step resumes playback processing of the moving image content from a time point which is a predetermined time earlier than the absolute address.

9. The playback apparatus according to claim 8, wherein the controlling step resumes playback processing of the moving image content on a buffer from a time point which is a predetermined time earlier than the absolute address, and outputs playback results from a time point at which an audio level of the playback results exceeds a predetermined threshold value.

10. The playback apparatus according to claim 6, wherein the determining step determines whether content is the moving image content or the other content on the basis of an extension of each of all file names.

* * * * *